US006834219B2

(12) United States Patent
Proulx

(10) Patent No.: US 6,834,219 B2
(45) Date of Patent: Dec. 21, 2004

(54) REMOTE CONTROL SYSTEM FOR A LOCOMOTIVE WITH TILT SENSOR

(75) Inventor: Richard Proulx, Pierrefonds (CA)

(73) Assignee: Beltpack Corporation, Montreal (CA)

( * ) Notice: Subject to any disclaimer, the term of this patent is extended or adjusted under 35 U.S.C. 154(b) by 0 days.

(21) Appl. No.: 10/356,751

(22) Filed: Jan. 30, 2003

(65) Prior Publication Data

US 2003/0144772 A1 Jul. 31, 2003

Related U.S. Application Data

(63) Continuation-in-part of application No. 10/236,235, filed on Sep. 6, 2002, now Pat. No. 6,691,005, which is a continuation of application No. 10/062,864, filed on Jan. 31, 2002, now Pat. No. 6,470,245.

(51) Int. Cl.[7] ................................................ G06F 17/00
(52) U.S. Cl. ...................................... 701/19; 246/187 A
(58) Field of Search ....................... 701/19; 246/187 A; 104/295, 300; 340/825.69; 235/382.5, 384

(56) References Cited

U.S. PATENT DOCUMENTS

| | | | | |
|---|---|---|---|---|
| 5,511,749 A | | 4/1996 | Horst et al. | 246/187 A |
| 5,685,507 A | * | 11/1997 | Horst et al. | 246/187 A |
| 5,817,934 A | | 10/1998 | Skantar | 73/121 |
| 6,300,933 B1 | | 10/2001 | Nagasaki et al. | 345/123 |
| 6,470,245 B1 | * | 10/2002 | Proulx | 701/19 |

FOREIGN PATENT DOCUMENTS

| | | |
|---|---|---|
| EP | 1 158 377 A | 11/2001 |
| JP | 08265881 | 3/1995 |

OTHER PUBLICATIONS

Analog Devices; Low Cost+ 2g Dual Axis; iMEMS Accelerometer with Digital Output; ADXL202; World Wide Web Site: http:www.analog.com; Analog Devices, Inc. 1998.

Horton et al., "A dual–axis tilt sensor based on micromachined accelerometers," *Sensors*, pp. 91–94 (Apr. 1996).

Jachman, John J., "Using piezoresistive accelerometers for automotive road testing," *Sensors*, pp. 40–47 (May 1990).

Link, Brian, "Field–qualified silicon accelerometers: from 1 milli g to 200,200 g," *Sensors*, pp. 28–33 (Mar. 1993).

Weinberg et al., "Using the ADXL202 accelerometer as a multifunction sensor (tilt, vibration and shock) in car alarms, "*Analog Devices–Technical Note* (Aug. 1998).

* cited by examiner

*Primary Examiner*—Marthe Y. Marc-Coleman
(74) *Attorney, Agent, or Firm*—Merchant & Gould P.C.

(57) ABSTRACT

A portable master controller for a locomotive remote control system is provided including a user interface, a tilt sensor, a processing unit and a transmission unit. The user interface is receives commands to control a movement of the locomotive from a human operator and generates a control signal on the basis of the commands. The tilt sensor generates inclination information about the portable master controller. The processing unit generates a digital command signal that includes a first component derived from the control signal received from the user interface and a second component derived from the inclination information received from the tilt sensor. The second component of the digital command signal allows a slave controller to determine whether the portable master controller is in an unsafe operational condition. The transmission unit then generates a RF transmission for conveying the digital command signal to a slave controller.

24 Claims, 2 Drawing Sheets

REMOTE CONTROL SYSTEM FOR A LOCOMOTIVE WITH TILT SENSOR

CROSS-REFERENCES TO RELATED APPLICATIONS

This application is a continuation-in-part of U.S. patent application Ser. No. 10/236,235 filed Sep. 6, 2002, now U.S. Pat. No. 6,691,005, which is a continuation of U.S. patent application Ser. No. 10/062,864 filed Jan. 31, 2002 and issued Oct. 22, 2002 as U.S. Pat. No. 6,470,245. The contents of the above documents are incorporated herein by reference.

FIELD OF THE INVENTION

The present invention relates to an electronic system and components thereof for remotely controlling a locomotive. The system has a tilt sensor designed to operate in conjunction with a processor onboard a locomotive in order to detect when a portable controller has an inclination outside a normal range of inclinations.

BACKGROUND

Economic constraints have led railway companies to develop portable master controllers allowing a ground-based operator to remotely control a locomotive in a switching yard. The portable master controller has a transmitter communicating with a slave controller on the locomotive by way of a radio link. To enhance safety, the portable master controller carried by the operator is provided with a tilt-sensing device to monitor the spatial orientation of the portable master controller and determine occurrence of operator incapacitating events, such as the operator tripping and falling over objects and loss of conscience due to a medical condition, among others.

Tilt sensing devices generally interact with a processing unit mounted in the portable master controller to detect when the tilt-sensing device reports that the portable master controller is outside the normal range of inclination. When the tilt-sensing device reports that the portable master controller is outside the normal range of inclination, the processing unit in the portable master controller will automatically generate, without operator input, a command signal over the radio link to stop the locomotive.

The portable master controllers are carried by the train operators and, as such, it is desirable for these portable master controllers to be light in order to avoid any unnecessary strain and/or injury to the operators. The above-described system requires that the portable master controllers be equipped with additional processing capabilities to process the inclination information and, as such, usually requires additional components to support this processing capability.

Against this background, the reader will appreciate that a clear need exists in the industry to develop a system and components thereof for remotely controlling a locomotive, featuring tilt-sensing devices which overcomes at least part of the deficiencies associated with the prior art.

SUMMARY

In accordance with a broad aspect, the invention provides a portable master controller for a locomotive remote control system where the locomotive remote control system has a slave controller mounted on-board a locomotive. The portable master controller includes a user interface, a tilt sensor, a processing unit and a transmission unit. The user interface receives commands to control movement of the locomotive from a human operator. In response to a command from the human operator, the user interface generates a control signal. The tilt sensor generates inclination information about the portable master controller. The processing unit, which is in communication with the user interface and with the tilt sensor, generates a digital command signal for directing the movement of the locomotive. The digital command signal includes a first component derived from the control signal received from the user interface for directing the movement of the locomotive and a second component derived from the inclination information received from the tilt sensor. The second component of the digital command signal can be used to determine whether the portable master controller is in an unsafe operational condition. The transmission unit, which is in communication with the processing unit, receives the digital command signal and generates a RF transmission conveying the digital command signal to a slave controller.

Advantageously, the inclination information obtained from the tilt sensor can be transmitted to the slave controller such that the determination of whether the master controller is in a safe or unsafe position can take place at the slave controller. This allows a reduction in computations that must be effect by the master controller. The transmission of inclination information along with control signal allows the slave controller to validate the digital command signal in part on the basis of the inclination information. For example, in the case where the command signal is instructing the locomotive to accelerate, and the inclination information indicates that the master controller is severely tipped, then the slave controller will not implement the command signal and perform a default safety operation instead.

In a first specific example of implementation, the tilt-sensing device in the portable master controllers is in the form of a solid-state tilt sensor. By "solid-state" is meant a tilt sensor that does not uses a liquid to produce inclination information. In a specific and non-limiting example of implementation, the solid-state tilt sensor includes a single axis accelerometer responsive to the acceleration of gravity. Optionally, the accelerometer is a multi-axis device responding to vertical acceleration and acceleration in at least another axis, as well. The ability to assess acceleration levels in axes other than the vertical axis permits detection of unsafe conditions that do not necessarily translate into an excessive inclination of the portable master controller.

In a second specific example of implementation, the tilt-sensing device in the portable master controllers is in the form of a mercury switch.

In accordance with a second broad aspect, the invention provides a slave controller for a locomotive remote control system where the locomotive remote control system also includes a portable master controller adapted for issuing RF transmissions conveying digital command signals to the slave controller. The slave controller is suitable for mounting onboard a locomotive and includes a receiver module and a processing unit. The receiver module is suitable for receiving an RF transmission conveying a digital command signal from a portable master controller. The digital command signal includes a first component indicative of a command for directing the movement of the locomotive and a second component indicative of inclination information. The processing unit, which is in communication with the receiver module, is responsive to digital command signals to determine, on the basis of the inclination information, if the portable master controller which transmitted the digital command signal is in a safe operational condition or in an unsafe operational condition. When the processing unit determines that the portable master controller is in an unsafe operational condition, the processing unit generates a local emergency command signal for directing the locomotive to acquire a secure condition. When the processing unit determines that the portable master controller is in a safe operational condition, the processing unit generates local signals controlling the locomotive on the basis of the first component of the digital command signal.

In a specific example of implementation, a "secure" condition is a condition in which the risk of accident from the locomotive is substantially reduced. An example of a secure condition is the locomotive being stopped. In such an example, the local emergency command signal directs the locomotive to stop.

In another broad aspect, the invention provides a remote control system for a locomotive including in combination the portable master controller defined broadly above and the slave controller for mounting on-board the locomotive also defined broadly above.

In accordance with another broad aspect, the invention provides a portable master controller for a locomotive remote control system, where the locomotive remote control system has a slave controller mounted on-board a locomotive. The portable master controller includes a user interface, a tilt sensor a processing unit and a transmission unit. The user interface is for receiving commands to control movement of the locomotive from a human operator. The user interface is responsive to a command from the human operator to generate a control signal. The tilt sensor generates inclination information about the portable master controller. The processing unit generates a command signal for directing the movement of the locomotive and an inclination indicator signal derived from the inclination information. The inclination indicator signal allows a slave controller to determine whether the portable master controller is in an unsafe operational condition. The transmission unit receives the command signal and generates a first RF transmission directed to a slave controller conveying the command signal to the slave controller. The transmission unit receives the inclination indicator signal and generates a second RF transmission directed to the slave controller conveying the inclination indicator signal.

In a specific example of implementation, the transmission unit transmits the first RF transmission at a first transmission rate and the second RF transmission conveying the inclination indicator signal at a second transmission rate different from the first transmission rate. On the basis of this inclination information, the slave controller can determine whether the master controller is in a safe or unsafe position. The slave controller can then cause the locomotive to acquire a secure condition in the cases where it is determined that the master controller is in an unsafe position. This specific implementation allows for transmitting to the slave controller the inclination information obtained from the tilt sensor separately from the command signals for controlling the locomotive. Optionally, the inclination indicator signal and the command signal may be transmitted over separate RF channels.

In accordance with another broad aspect, the invention provides a slave controller for a locomotive remote control system, where the locomotive remote control system has a portable master controller adapted for generating RF transmissions to the slave controller. The slave controller is suitable for mounting onboard a locomotive and includes a receiver module and a processing unit. The receiver module is suitable for receiving RF transmissions conveying digital command signals including a command signal for directing movement of the locomotive and an inclination indicator signal. The processing unit determines at least in part on the basis of the inclination indicator signal if the portable master controller, which transmitted the digital command signal, is in a safe operational condition or in an unsafe operational condition. When the processing unit determines that the portable master controller is in an unsafe operational condition, the processing unit generates a local emergency command signal for directing the locomotive to acquire a secure condition. When the processing unit determines that the portable master controller is in a safe operational condition, the processing unit generates local signals for controlling the locomotive on the basis of the command signal.

In a specific implementation the inclination indicator signal and the command signal are received over separate RF channels.

BRIEF DESCRIPTION OF THE DRAWINGS

A detailed description of examples of implementation of the present invention is provided hereinbelow with reference to the following drawings, in which.

DETAILED DESCRIPTION

Figure 1:
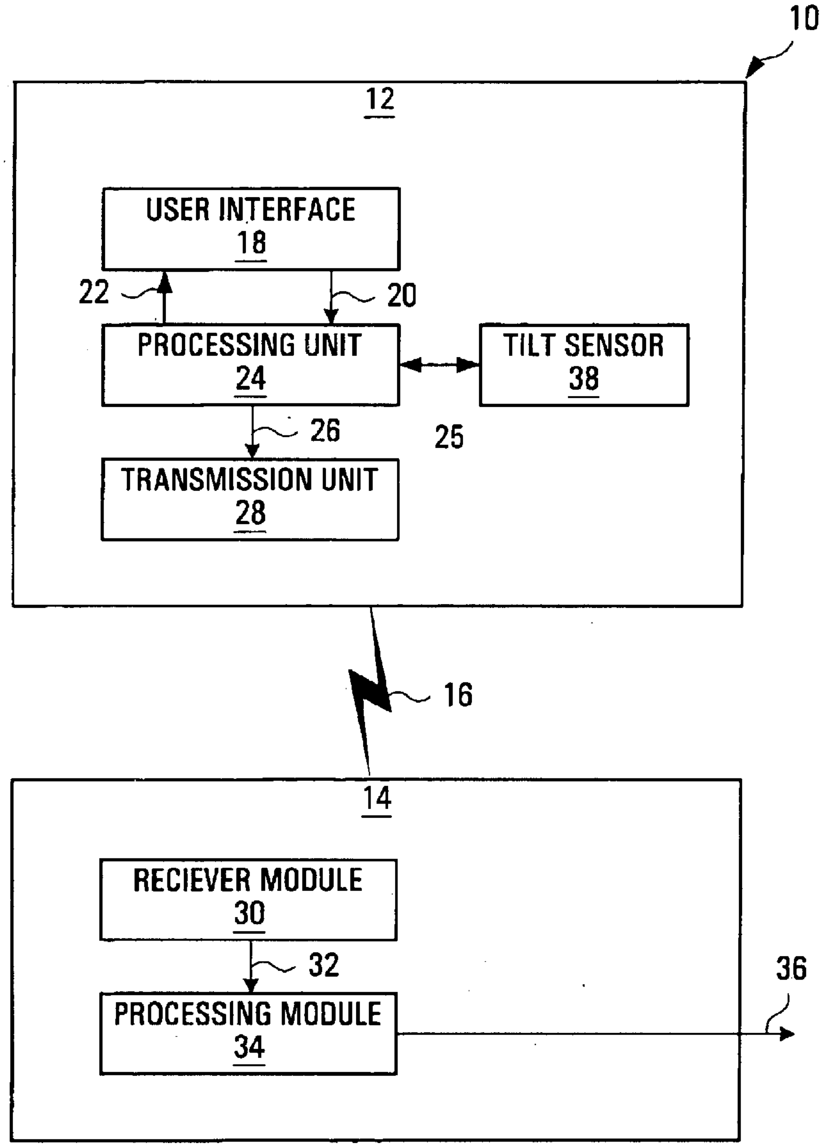
FIG. 1 is a functional block diagram of the remote control system for a locomotive according to a specific and non-limiting example of implementation of the invention.

FIG. 1 is a high-level block diagram of a remote control system 10 for a locomotive. The remote control system 10 includes a portable master controller 12 that is carried by a human operator. The system 10 also includes a slave controller 14 mounted on-board the locomotive (locomotive not shown in the drawings). The portable master controller 12 and the slave controller 14 exchange information over a radio link 16.

The portable master controller 12 includes a user-interface 18 through which the operator enters commands to control the movement of the locomotive. Such commands may include forward movement, backward movement, movement at a certain speed, coasting, stopping, etc. The user-interface 18 may comprise a variety of input mechanisms to permit the user to enter commands. Those input mechanisms may include electromechanical knobs and switches, keyboard, pointing device, touch sensitive surface and speech recognition capability, among others. Optionally, the user interface 18 also conveys information to the operator, such as status information, alarms, etc. The user-interface 18 may comprise a variety of output mechanisms to communicate information to the user such as visual display or audio feedback, among others.

The user-interface 18 generates control signals 20, which represent the inputs of the operator. Those control signal 20 represent commands, such as move forward, move backwards, stop, move at a selected speed, throttle command, brake command, among others. In instances where the user-interface 18 also communicates information to the operator, data signals 22 are supplied to the user-interface 18 from a processing unit 24, to be described below. The data signals convey the information that is to be communicated to the user.

An important feature of the system 10 is a tilt sensor 38 that is part of the portable master controller 12. The tilt sensor 38 produces inclination information about the portable master controller 12 and sends this inclination information to the processing unit 24.

The processing unit 24 receives and processes the control signals 20 and the inclination information produced by the tilt sensor. At its output, the processing unit 24 will issue digital command signals 26 that direct the operation of the locomotive.

In a first specific example of implementation, the digital command signal 26 includes a first component derived from the control signal received from the user interface 18 for directing the movement of the locomotive and a second component derived from the inclination information received from the tilt sensor 38. The digital command signals 26 are then supplied to a transmission unit 28 that generates a Radio Frequency (RF) transmission conveying those commands over the RF link 16 to the slave controller 14. In a specific implementation, the transmission unit 28 generates an RF transmission conveying the digital command signal to the slave controller. The second component of the digital command signal allows a slave controller to determine whether the portable master controller is in an unsafe operational condition.

In a second specific example of implementation, the processing unit 24 generates separate digital command signal 26 for conveying the control signal and the inclination information. The digital command signals 26 are then supplied to a transmission unit 28 that generates a Radio Frequency (RF) transmission conveying those commands over the RF link 16 to the slave controller 14. The transmission unit 28 receives the command signal and generates a first RF transmission directed to a slave controller conveying the command signal to the slave controller. The transmission unit receives the inclination indicator signal and generates a second RF transmission directed to the slave controller conveying the inclination indicator signal. Optionally, the transmission unit 28 transmits the first RF transmission at a first transmission rate and the second RF transmission conveying the inclination indicator signal at a second transmission rate different from the first transmission rate. In accordance with another variant, the first RF transmission conveying the command signal and the second RF transmission conveying the inclination indicator signal are transmission over different RF channels.

The slave controller 14 is comprised of a receiver module 30 for sensing the RF transmission over the RF link 16. It will be appreciated that RF link 16 may include a plurality of RF channels and that receiver module 30 may be adapted for detecting RF transmissions over multiple channels.

The receiver module 30 extracts from the RF transmissions and releases at its output digital command signals 32 that are passed to a processing module 34. Processing module 34 is responsive to digital command signals to determine at least in part on the basis of the inclination information contained therein if the portable master controller 12 which transmitted the digital command signal is in a safe operational condition or in an unsafe operational condition. When the processing module 34 determines that the portable master controller 12 is in an unsafe operational condition, the processing module 34 generates a local emergency command signal for directing the locomotive to acquire a secure condition. When the processing module 34 determines that the portable master controller 12 is in a safe operational condition, the processing module generates local signals controlling the locomotive on the basis of the first component of the digital command signal. The processing module then issues local signals 36 that control the locomotive. The local signals 36 include, for example, throttle settings, brake settings, etc.

The inclination information processing strategy, which determines if the portable master controller 12 is in an operational condition that is safe or unsafe, can greatly vary and can take into account various parameters. One of those parameters is the degree of inclination of the portable master controller 12. In one example, the degree of inclination can be quantified in terms of angle of inclination. Another parameter is the time during which the portable master controller 12 is maintained at or beyond a certain degree of inclination. One possible strategy is to declare an unsafe operational condition only after a certain degree of inclination has been maintained for a predetermined time period, thus avoiding issuing the emergency digital command signal in cases where the operator moves his body in such a way that it will excessively tilt the portable master controller 12, but only for a moment.

The reader will appreciate that a wide variety of inclination information processing strategies are possible without departing from the spirit of the invention. All those strategies rely on the degree of inclination as parameter, alone or in combination with other parameters.

In a first specific example of implementation, the tilt-sensing device in the portable master controllers is in the form of a mercury switch.

In a second specific example of implementation, the tilt sensor 38 is an accelerometer that is responsive to static gravitational acceleration. By "static" it is meant that the accelerometer senses the force of gravity even when the portable master controller 12 is not moving vertically up or down. The accelerometer is mounted in the casing of the portable master controller 12 such that the axis along which the acceleration is sensed coincides with the vertical axis. When the portable master controller 12 is inclined, the component of the force of gravity along the vertical axis changes which allows determining the degree of inclination of the portable master controller 12.

Optionally, the accelerometer may also be sensitive about axes other than the vertical axis to detect abnormal accelerations indicative of potentially unsafe conditions that may not translate in an abnormal inclination of the portable master controller 12. Examples of such other abnormal accelerations arise when the portable master controller 12 (or the operator) is severely bumped without, however, the operator falling on the ground.

In a possible variant the tilt sensor 38 may include a plurality of accelerometers, each accelerometer being sensitive in a different axis.

When the tilt sensor 38 includes an accelerometer that outputs a signal having both a dynamic and a static component, it is desirable to filter out the dynamic component such as to be able to more easily determine or derive the orientation of the master controller 12. Techniques to filter out the dynamic component of the output signal are known in the art and will not be discussed here in detail. The filtering of the dynamic component may be effected by processing unit 24 or by processing module 34.

If the processing unit 34 recognizes an unsafe operational condition, it issues an emergency command signal to secure the locomotive. One example of securing the locomotive includes directing the locomotive to perform to stop.

In a specific and non-limiting example of implementation the tilt sensor 38 is based on an accelerometer available from Analog Devices Inc. in the USA, under part number ADXL202. The output of the tilt sensor 38 is a pulse width modulated signal, where the width of the pulse indicates the degree of inclination.

Figure 2:
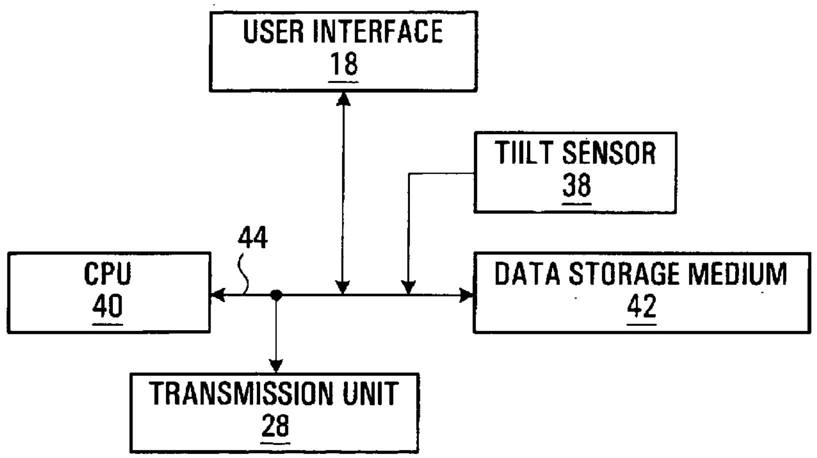
FIG. 2 is a structural block diagram of the portable master controller of the system shown in FIG. 1.

FIG. 2 is a structural block diagram of the portable master controller 12. The portable master controller 12 is largely software implemented and includes a Central Processing Unit (CPU) 40 that connects with a data storage medium 42 over a data bus 44. The data storage medium 42 holds the program element that is executed by the CPU 40 to implement various functional elements of the portable master controller 12, in particular the processing unit 24. Data is exchanged between the CPU 40 and the data storage medium 42 over the data bus 44. Peripherals connect to the data bus 44 such as to send and receive information from the CPU 40 and the data storage medium 42. Those peripherals include the user interface 18, the transmission unit 28 and the tilt sensor 38.

Figure 3:
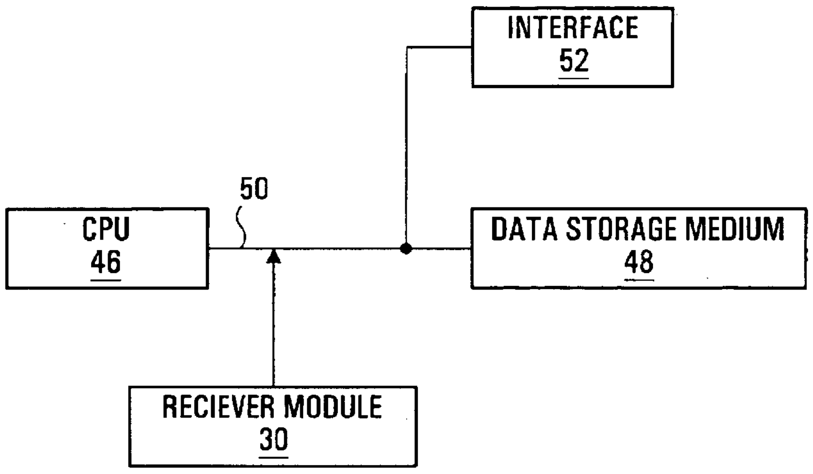
FIG. 3 is a structural block diagram of the slave controller of the system shown in FIG. 1; and In the drawings, embodiments of the invention are illustrated by way of example. It is to be expressly understood that the description and drawings are only for purposes of illustration and as an aid to understanding, and are not intended to be a definition of the limits of the invention.

FIG. 3 is a structural block diagram of the slave controller 14. As is the case with the portable master controller 12, the slave controller 14 has a CPU 46 connected to a data storage medium 48 with a data bus 50. The data storage medium 48 holds the program element that is executed by the CPU 46 to implement various functional elements of the slave controller 14, in particular the processing module 34. Peripherals connect to the data bus 50 such as to send and receive information from the CPU 46 and the data storage medium 48. Those peripherals include the receiver module 30 and an interface 52 through which the slave controller 14 connects to the locomotive controls.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. A portable master controller for a locomotive remote control system, the locomotive remote control system having a slave controller mounted on-board a locomotive, said portable master controller comprising:

a) a user interface for receiving commands to control a movement of the locomotive from a human operator, said user interface being responsive to a command from the human operator to generate a control signal;

b) a tilt sensor for generating inclination information about said portable master controller;

c) a processing unit in communication with said user interface and with said tilt sensor, said processing unit being adapted to generate a digital command signal for directing the movement of the locomotive, the digital command signal including:

i) a first component derived from the control signal received from said user interface for directing the movement of the locomotive;

ii) a second component derived from the inclination information received from said tilt sensor;

d) a transmission unit in communication with said processing unit for receiving the digital command signal and for generating an RF transmission conveying the digital command signal to the slave controller, the second component of the digital command signal allowing a slave controller to determine whether the portable master controller is in an unsafe operational condition.

2. A portable master controller as defined in claim 1, wherein said tilt sensor is a solid-state tilt sensor.

3. A portable master controller as defined in claim 1, wherein said tilt sensor is a mercury switch sensor.

4. A portable master controller as defined in claim 2, wherein said solid-state tilt sensor includes an accelerometer.

5. A portable master controller as defined in claim 4, wherein said accelerometer responds to static gravitational acceleration.

6. A portable master controller as defined in claim 5, wherein said accelerometer generates an output signal including a static component representative of the static gravitational acceleration and a dynamic component representative of dynamic acceleration.

7. A portable master controller as defined in claim 6, wherein said processing unit is operative to filter out the dynamic component.

8. A slave controller for a locomotive remote control system, the locomotive remote control system having a portable master controller adapted for generating RF transmissions conveying digital command signals to the slave controller, said slave controller being suitable for mounting onboard a locomotive and comprising:

a) a receiver module suitable for receiving RF transmissions conveying a digital command signal from a portable master controller, the digital command signal including:

i) a first component indicative of a command for directing the movement of the locomotive; and ii) a second component indicative of inclination information;

b) a processing unit in communication with said receiver module, said processing unit being responsive to digital command signals to:

i) determine at least in part on the basis of the inclination information if the portable master controller which transmitted the digital command signal is in a safe operational condition or in an unsafe operational condition;

ii) when said processing unit determines that the portable master controller is in an unsafe operational condition, said processing unit being operative to generate a local emergency command signal for directing the locomotive to acquire a secure condition;

iii) when said processing unit determines that the portable master controller is in a safe operational condition, said processing unit being operative to generate local signals controlling the locomotive on the basis of the first component of the digital command signal.

9. A slave controller as defined in claim 8, wherein the local emergency command signal directs the locomotive to stop.

10. A remote control system for a locomotive, comprising:

a) a portable master controller, including:

i) a user interface for receiving commands to control a movement of the locomotive from a human operator, said user interface being responsive to the commands from the human operator to generate control signals;

ii) a tilt sensor for generating inclination information about said portable master controller.

iii) a processing unit in communication with said user interface and with said tilt sensor, said processing unit being adapted to generate a digital command signal for directing the movement of the locomotive, the digital command signal including:

(1) a first component derived from the control signals received from said user interface for directing the movement of the locomotive;

(2) a second component derived from the inclination information received from said tilt sensor;

iv) a transmission unit in communication with said processing unit for receiving the digital command signals and for generating an RF transmission conveying the digital command signal to the slave controller;

b) a slave controller for mounting on-board the locomotive, said slave controller including:

i) a receiver module for sensing the RF transmission conveying the digital command signal;

ii) a processing unit in communication with said receiver module, said processing unit being responsive to the digital command signal to:

(1) determine at least in part on the basis of the inclination information if the portable master controller is in a safe operational condition or in an unsafe operational condition;

(2) when said processing unit determines that the portable master controller is in an unsafe operational condition, said processing unit being operative to generate a local emergency command signal for directing the locomotive to acquire a secure condition;

(3) when said processing unit determines that the portable master controller is in a safe operational condition, said processing unit being operative to generate local signals controlling the locomotive on the basis of the first component of the digital command signal.

11. A remote control system as defined in claim 10, wherein said tilt sensor is a solid-state tilt sensor.

12. A remote control system as defined in claim 10, wherein said tilt sensor is a mercury switch sensor.

13. A remote control system as defined in claim 11, wherein said solid-state tilt sensor includes an accelerometer.

14. A remote control system as defined in claim 13, wherein said accelerometer responds to static gravitational acceleration.

15. A remote control system as defined in claim 14, wherein said accelerometer generates an output signal including a static component representative of the static gravitational acceleration and a dynamic component representative of dynamic acceleration.

16. A remote control system as defined in claim 10, wherein the emergency digital command signal directs the locomotive to stop.

17. A portable master controller for a locomotive remote control system, the locomotive remote control system having a slave controller mounted on-board a locomotive, said portable master controller comprising:

a) means for receiving commands to control a movement of the locomotive from a human operator, said user interface being responsive to the commands from the human operator to generate control signals;

b) tilt sensing means for generating inclination information about said portable master controller;

c) processing means adapted for generating digital command signals for directing the movement of the locomotive, the digital command signals including:

i) a first component derived from the control signals received from said user interface for directing the movement of the locomotive;

ii) a second component derived from the inclination information received from said tilt sensor;

d) transmission means in communication with said processing means for receiving the digital command signals and for generating an RF transmission conveying the digital command signals to a slave controller, the second component of the digital command signal allowing the slave controller to determine whether the portable master controller is in an unsafe operational condition.

18. A portable master controller for a locomotive remote control system, the locomotive remote control system having a slave controller mounted on-board a locomotive, said portable master controller comprising:

a) a user interface for receiving commands to control a movement of the locomotive from a human operator, said user interface being responsive to a command from the human operator to generate a control signal;

b) a tilt sensor for generating inclination information about said portable master controller;

c) a processing unit adapted to:

i) generate a command signal for directing the movement of the locomotive;

ii) an inclination indicator signal derived from the inclination information;

d) a transmission unit in communication with said processing unit for:

i) receiving the command signal and for generating a first RF transmission directed to a slave controller conveying the command signal to the slave controller;

ii) receiving the inclination indicator signal and for generating a second RF transmission directed to the slave controller conveying the inclination indicator signal, the inclination indicator signal allowing the slave controller to determine whether the portable master controller is in an unsafe operational condition.

19. A portable master controller as defined in claim 18, wherein the transmission unit transmits the first RF transmission and the second RF transmission over separate RF channels.

20. A portable master controller as defined in claim 18, wherein said tilt sensor is a solid-state tilt sensor.

21. A portable master controller as defined in claim 18, wherein said tilt sensor is a mercury switch sensor.

22. A portable master controller as defined in claim 18, wherein said transmission unit is operative for transmitting the first RF transmission at a first transmission rate and the second RF transmission conveying the inclination indicator signal at a second transmission rate different from the first transmission rate.

23. A slave controller for a locomotive remote control system, the locomotive remote control system having a portable master controller adapted for generating RF transmissions to the slave controller, said slave controller being suitable for mounting onboard a locomotive and comprising:

a) a receiver module suitable for receiving RF transmissions conveying digital command signals including:

i) a command signal for directing movement of the locomotive;

ii) an inclination indicator signal;

b) a processing unit in communication with said receiver module, said processing unit being responsive to digital command signals to:

i) determine at least in part on the basis of the inclination indicator signal if the portable master controller which transmitted the digital command signal is in a safe operational condition or in an unsafe operational condition;

ii) when said processing unit determines that the portable master controller is in an unsafe operational condition, said processing unit being operative to generate a local emergency command signal for directing the locomotive to acquire a secure condition;

iii) when said processing unit determines that the portable master controller is in a safe operational condition, said processing unit being operative to generate local signals controlling the locomotive on the basis of the command signal.

24. A slave controller as defined in claim 23, wherein the receiver unit is adapted to detect a digital command signal conveying a command signal over a first RF channel and a digital command signal conveying an inclination indicator signal over a second RF channel distinct from said first RF channel.

* * * * *